(12) United States Patent
Kawabata et al.

(10) Patent No.: US 7,595,130 B2
(45) Date of Patent: Sep. 29, 2009

(54) BATTERY SEPARATOR AND LITHIUM SECONDARY BATTERY

(75) Inventors: Kenji Kawabata, Yamaguchi (JP); Koji Abe, Yamaguchi (JP)

(73) Assignee: UBE Industries, Ltd., Ube-Shi, Yamaguchi (JP)

( * ) Notice: Subject to any disclaimer, the term of this patent is extended or adjusted under 35 U.S.C. 154(b) by 455 days.

(21) Appl. No.: 10/569,971

(22) PCT Filed: Aug. 30, 2004

(86) PCT No.: PCT/JP2004/012499

§ 371 (c)(1), (2), (4) Date: Feb. 28, 2006

(87) PCT Pub. No.: WO2005/022674

PCT Pub. Date: Mar. 10, 2005

(65) Prior Publication Data

US 2008/0187825 A1 Aug. 7, 2008

(30) Foreign Application Priority Data

| Aug. 29, 2003 | (JP) | ............................. 2003-306354 |
| Aug. 29, 2003 | (JP) | ............................. 2003-306355 |
| Dec. 24, 2003 | (JP) | ............................. 2003-426650 |
| Dec. 24, 2003 | (JP) | ............................. 2003-426651 |

(51) Int. Cl.
   *H01M 2/16* (2006.01)

(52) U.S. Cl. .................. 429/144; 429/129; 429/142; 429/145; 429/249; 429/254; 429/122; 429/330; 429/331; 429/332; 429/338; 429/342; 429/341; 429/337; 429/340

(58) Field of Classification Search ................. 429/144, 429/122, 338, 342, 341, 337, 340, 129, 142, 429/145, 249, 254, 330, 331, 332
See application file for complete search history.

(56) References Cited

U.S. PATENT DOCUMENTS 4,396,689 A * 8/1983 Grimes et al. ................ 429/105
6,080,507 A * 6/2000 Yu ............................... 429/145

(Continued)

FOREIGN PATENT DOCUMENTS

JP          57-205966       12/1982

(Continued)

OTHER PUBLICATIONS

International Search Report, PCT/JP2004/012499, Nov. 22, 2006.

(Continued)

*Primary Examiner*—Laura S Weiner
(74) *Attorney, Agent, or Firm*—Nixon Peabody LLP; Jeffrey L. Costellia

(57) ABSTRACT

A separator is disclosed which enables to inject a non-aqueous electrolytic solution easily during production of batteries such as lithium ion secondary batteries and also enables to produce a battery which is excellent in various battery performances.

The battery separator comprises a long porous film in which plural non-porous linear regions are arranged in a width direction of the film, at least one surface of the linear regions being a concave or convex surface is advantageously used as a battery separator for lithium secondary batteries or the like.

6 Claims, 5 Drawing Sheets

U.S. PATENT DOCUMENTS

| | | | |
|---|---|---|---|
| 6,180,280 B1 * | 1/2001 | Spotnitz | 429/145 |
| 6,878,226 B2 * | 4/2005 | Yu | 156/229 |
| 7,399,555 B2 * | 7/2008 | Sano et al. | 429/144 |
| 2002/0076615 A1 | 6/2002 | Tanaka et al. | |
| 2003/0039886 A1 * | 2/2003 | Zhang et al. | 429/317 |

FOREIGN PATENT DOCUMENTS

| | | |
|---|---|---|
| JP | 05-151951 | 6/1993 |
| JP | 11-273723 | 10/1999 |
| JP | 2000-357517 | 12/2000 |
| JP | 2002-151044 | 5/2002 |
| JP | 2002-319382 | 10/2002 |
| JP | 2002-367591 | 12/2002 |
| WO | WO 03005644 * | 7/2003 |

OTHER PUBLICATIONS

International Preliminary Report on Patentability and Written Opinion of the International Searching Authority, PCT/JP2004/012499, May 22, 2006 (Written Opinion mailed Nov. 22, 2004.

* cited by examiner

Continuous form   Dispersed form

BATTERY SEPARATOR AND LITHIUM SECONDARY BATTERY

FIELD OF THE INVENTION

The present invention relates to a battery separator and a lithium secondary battery.

BACKGROUND OF THE INVENTION

The lithium battery has recently been widely used for example, as an electric source for driving small-sized electronics. The lithium battery has a basic structure comprising a positive electrode, a negative electrode, a separator and a non-aqueous electrolytic solution, which are contained in a cylindrical, square-shaped or coin-shaped cell. The positive electrode generally comprises a complex oxide of lithium such as $LiCoO_2$. The negative electrode generally comprises carbonaceous material or metallic lithium. The separator for the lithium battery comprises a porous film formed of polyolefin such as polyethylene (PE) and polypropylene (PP) or a laminated porous film comprising one porous polyethylene film interposed between two porous polypropylene films.

In a process for preparation of a cylindrical lithium secondary battery, the battery has been prepared for example, by laminating positive and negative electrode sheets and a separator, winding the laminate around a metallic winding pin to form a battery element (in the form of a spirally wound roll), placing the roll in a battery cell, and injecting a non-aqueous electrolytic solution into the cell. The recent lithium secondary battery has a higher capacity as a result of development competition. In a general way of enlarging the capacity, volume of electrode active materials increases in a battery cell with a limited size, while volume of the other substances decreases. Accordingly, density of electrode composite including the electrode active materials becomes increased, and thickness of the electrode composite becomes increased. In contrast, a current collector of the electrode composite and the separator are required to have a small thickness. Since the remaining space in the cell becomes extremely small, it is difficult to inject the non-aqueous electrolytic solution into the cell. It becomes difficult and takes a long time to inject the electrolytic solution into the cell. It is also difficult to impregnate the separator uniformly with the non-aqueous electrolytic solution.

Japanese Patent Provisional Publication No. 6-333550 discloses an invention of making a rough surface on a separator to make it easy to inject a non-aqueous electrolytic solution into a cell in which a roll of the separator and electrode sheets is placed. The publication further describes that plural grooves are provided in a width direction of the separator in addition to the rough surface.

DISCLOSURE OF THE INVENTION

Problems to be Solved by the Invention

The separator disclosed in Japanese Patent Provisional Publication No. 6-333550, which has a rough surface and grooves arranged in a width direction, is effective in injecting the non-aqueous electrolytic solution easily into the cell. However, a process of forming the rough surface or the grooves degrades the mechanical strength and the dimensional stability of the separator. As is described above, the thickness of the recent separator becomes small. A short circuit might be caused if the mechanical strength or the dimensional stability is degraded in such a thin separator.

Means to Solve the Problem

The present invention provides a battery separator comprising a long (or continuous) porous film in which plural non-porous linear regions are arranged in a width direction of the film, at least one surface of the linear regions being a concave or convex surface.

The invention also provides a lithium secondary battery comprising a positive electrode, a negative electrode, a separator and a non-aqueous electrolytic solution, wherein the separator comprises a long (or continuous) porous film in which plural non-porous linear regions are arranged in a width direction of the film, at least one surface of the linear regions being a concave or convex surface.

The preferred embodiments of the invention are shown below.

(1) At least one end of the non-porous linear regions of the separator reaches a side face of the separator.

(2) The non-porous linear regions of the separator are so arranged that a non-porous linear concave region and a non-porous linear convex region are arranged alternately along a length direction of the separator.

(3) The non-porous linear regions of the separator are arranged in the form of slant lattice.

(4) The non-porous linear regions of the separator are arranged along a length direction of the separator to form 0.1 to 10 regions per centimeter.

(5) The long porous film of the separator comprises one porous polyethylene film interposed between two porous polypropylene films.

(6) The non-aqueous electrolytic solution of the lithium secondary battery contains at least one compound selected from the group consisting of a cyclic carbonate, a linear carbonate, a linear ester and a lactone.

(7) The non-aqueous electrolytic solution of the lithium secondary battery contains at least one compound selected from the group consisting of vinylene carbonate, dimethylvinylene carbonate, vinyl-ethylene carbonate, α-angelica lactone and divinylsulfone.

EFFECT OF THE INVENTION

In a battery such as a lithium secondary battery, the separator according to the present invention is advantageously used. The separator of the invention makes it easy to inject a non-aqueous electrolytic solution into a battery cell in which a roll of the separator and the electrode sheets is placed. Accordingly, the time required for injection can be shortened. Further, the separator can be uniformly impregnated with the non-aqueous electrolytic solution after injection. Therefore, the present invention has not only an effect on working efficiency in preparation of the battery, but also an effect of improving cycle characteristics where the battery is a secondary battery. Furthermore, the mechanical strength and the dimensional stability of the separator are improved according to the present invention. Therefore, the short circuit is scarcely caused, and the battery is prevented from excessive charge.

BEST MODE FOR CARRYING OUT THE INVENTION

The characteristic structure of the battery separator of the present invention is described below referring to the attached drawings.

FIG. 1 is a sectional view partially showing an example of the battery separator according to the present invention. In FIG. 1, a non-porous region has a concave surface. The separator of FIG. 1 has a laminated structure comprising a porous polypropylene layer 1, a porous polyethylene layer 2 and a porous polypropylene layer 3. The separator as a whole consists of porous regions 5 and a non-porous region 6. A concave surface 4a is formed on the non-porous region.

FIG. 2 is a sectional view partially showing another example of the battery separator according to the invention. In FIG. 2, a non-porous region has a convex surface. The separator of FIG. 2 has a laminated structure comprising a porous polypropylene layer 1, a porous polyethylene layer 2 and a porous polypropylene layer 3. The separator as a whole consists of porous regions 5 and a non-porous region 6. A convex surface 4b is formed on the non-porous region.

FIGS. 3 to 11 show various examples of a pattern for a concave or convex surface of the battery separator according to the present invention.

In FIG. 3, the concave or convex regions are arranged in the form of lines drawn fully in the width direction of the separator.

In FIG. 4, the concave or convex regions are arranged in the form of symmetrical V-shapes having a center line drawn in the length direction of the separator.

In FIG. 5, the concave or convex regions are arranged in the form of slant lattice drawn fully in the width direction of the separator.

In FIG. 6, the concave or convex regions are arranged in the form of S-shapes drawn fully in the width direction of the separator.

In FIG. 7, the concave regions and the convex regions are arranged alternately with each other, and both of them are arranged in the form of lines drawn fully in the width direction of the separator.

In FIG. 8, the concave regions are arranged in the form of lines drawn fully in the width direction of the separator, and the convex regions are further arranged in the form of lines drawn in the length direction of the separator.

In FIG. 9, the concave regions are arranged in the form of lines drawn fully in the width direction of the separator, and the convex regions are further arranged in the form of lines drawn in the slant direction of the separator.

In FIG. 10, the concave regions are arranged in the form of symmetrical V-shapes having a center line drawn in the length direction of the separator, and the convex regions are further arranged in the form of circles.

In FIG. 11, the concave regions are arranged in the form of lines drawn fully in the width direction of the separator, and the convex regions are further arranged in the form of dispersed dots.

The porous film used in the separator of the present invention has numerous minute through-type holes. The porous film for the separator preferably has a large ion permeability and a certain mechanical strength. Further, the film preferably is a thin insulating membrane. The film can be made of polyolefin, a fluorinated polymer, a polymer of cellulose origin, polyimide, polyamide (nylon), or glass fibers. The film can be in the form of a non-woven fabric, a fabric, or a minute porous film. The film is preferably made of polypropylene, polyethylene, a mixture of polypropylene and polyethylene, or a mixture of polypropylene and polyperfluoroethylene. The film can also be a single layered porous film of polypropylene or polyethylene, or a multi-layered porous film of polypropylene and polyethylene. The pores in the porous film can be formed according to a stretching (dry) process or an extraction (wet) process.

The concave region formed on the separator of the present invention has a non-porous bottom. The non-porous bottom preferably extends in a direction forming an angle of 90±10° with the length direction of the battery separator. The concave regions are arranged to form preferably of 0.1 region per centimeter or more, more preferably of 0.3 region per centimeter or more, and most preferably of 0.5 region per centimeter or more. The concave regions are arranged to form preferably of 10 regions per centimeter or less, more preferably of 5 regions per centimeter or less, and most preferably of 3 regions per centimeter or less.

The concave region formed on the separator of the invention has a depth preferably of 2 μm or more, more preferably of 3 μm or more, and most preferably of 4 μm or more. The concave region has a depth preferably of 10 μm or less, more preferably of 9 μm or less, and most preferably of 8 μm or less.

The concave region formed on the separator of the invention has a width preferably of 3 μm or more, more preferably of 5 μm or more, and most preferably of 10 μm or more. The concave region has a width preferably of 500 μm or less, more preferably of 300 μm or less, and most preferably of 200 μm or less.

The concave region is preferably formed on at least one surface of the battery separator. The concave regions can be formed on both surfaces of the battery separator. The concave (or convex) regions are preferably formed alternatively on one side and on the other side (on the upper side and on the back side) to shorten the time for injection of the electrolytic solution effectively. In the case that the battery is excessively charged to produce gas on the positive electrode, the concave region on the battery separator can serve as a degassing passage. Therefore, the concave region is preferably arranged to face the positive electrode so as to serve effectively as the degassing passage.

There is no specific limitation with respect to the process for forming concave regions having non-porous bottoms on a separator. The concave region is advantageously formed by nip rollers according to a thermal pressing method. The thermal pressing method is a method by pressing the porous film under nipping pressure between heated rollers. The film is preferably heated to the melting point of the film material of the film within a range of ±80° C., and more preferably within a range of ±30° C. The nipping pressure is preferably in the range of 0.1 to 10 kg/cm$^2$, and more preferably in the range of 1 to 3 kg/cm$^2$.

The concave regions can be formed before or after forming pores according to a stretching (dry) or an extraction (wet) process. The concave regions are preferably formed after forming pores. The film is uniaxially or biaxially stretched to optimize the thickness, the porosity or the porous structure in any case that the process of forming pores is a stretching (dry) or an extraction (wet) process. The concave regions can be formed before or after uniaxially or biaxially stretching the film. The film is uniaxially stretched in the length direction to form pores generally according to the stretching (dry) process. In the case of battery separator manufactured by dry process, the shrinkage in the width direction is small by forming concave or convex regions on the battery separator. Therefore, the concave regions are preferably formed after conducting the uniaxially stretching process. On the other hand, the film is biaxially stretched in the width direction as well as the length direction generally according to the extraction (wet) process. Therefore, the concave regions are preferably formed before conducting the biaxially stretching process.

The separator preferably has convex regions in addition to or in place of the concave regions. The convex region preferably extends in a direction essentially perpendicular to the length direction of the porous film. The convex region formed on the porous film preferably extends in a direction forming an angle of 90±30° with the length direction of the battery separator. The convex regions are arranged to form preferably of 0.1 region per centimeter or more, more preferably of 0.3 region per centimeter or more, and most preferably of 0.5 region per centimeter or more. The convex regions are arranged to form preferably of 10 regions per centimeter or less, more preferably of 5 regions per centimeter or less, and most preferably of 3 regions per centimeter or less.

The convex region formed on the separator of the invention has a height preferably of 2 μm or more, more preferably of 3 μm or more, and most preferably of 4 μm or more. The convex region has a height preferably of 20 μm or less, more preferably of 15 μm or less, and most preferably of 10 μm or less.

The convex region formed on the separator of the invention has a width preferably of 3 μm or more, more preferably of 5 μm or more, and most preferably of 10 μm or more. The convex region has a width preferably of 500 μm or less, more preferably of 300 μm or less, and most preferably of 200 μm or less.

The convex region is preferably formed on at least one surface of the battery separator. The convex regions can be formed on both surfaces of the battery separator. In the case that the battery is excessively charged to produce gas on the positive electrode, the convex region on the battery separator can serve as a degassing passage. Therefore, the convex region is preferably arranged to face the positive electrode to serve effectively as the degassing passage.

The convex region formed on the separator can be kept after injecting the solution. The form of the convex region can also be made plane by dissolving in the non-aqueous electrolytic solution. In the case that the form of the convex region is kept after injecting the solution, a film having a certain thickness or filler can be overlaid onto the battery separator according to a thermal pressing process. The film or filler is preferably made of a substance selected from the group consisting of polypropylene, polyethylene, ethylene-α-olefin copolymer, poly-1-butene, propylene-1-butene copolymer, polyimide, and cellulose.

In the case that the convex region on the battery separator of the present invention should be made plane after injecting the solution, the convex region can be made of a polymer such as polyethylene oxide, polyvinylidene fluoride, polyacrylonitrile, polystyrene or a copolymer such as ethylene-methacrylic acid copolymer, ethylene-acrylic ester copolymer, styrene-butadiene co-polymer or a copolymer of the above-mentioned polymer. The convex region of the polymer or copolymer can be made plane dissolving in the non-aqueous electrolytic solution after constructing the battery. The tension of winding up the battery element can be released by disappearing of the convex regions plane after constructing the battery. Accordingly, the process of making the convex regions plane can have an effect of preventing the battery from damage caused by tight winding-up tension.

There is no specific limitation with respect to a process for forming non-porous convex regions on a separator. The convex region can be formed by coating the separator with a solution. The convex region can also be formed by the above-mentioned thermal pressing process. For example, polyethylene filaments can be pressed under heating on a battery separator comprising three layers of polypropylene/polyethylene/polypropylene in the width direction of the separator to form a continuous convex region in the direction forming an angle of about 90° with the length direction of the separator.

In the present invention, the concave or convex region has a structure of guiding the non-aqueous electrolytic solution in a direction essentially perpendicular to the length direction of the separator. The region is preferably in the form of a continuous single line, a series of successive dots, or a series of successive line segments. The line or series structure is preferably symmetrical to the center line in the length direction of the separator. The structure is more preferably in a continuous form such as a form of a straight line, lattice, slant lattice, V-shape, W-shape, and S-shape. The schematic plane views of the patterns of the concave or convex region in the form of the straight line, the V-shape, the lattice and the S-shape formed on the separator are shown in FIGS. 3 to 6.

The concave structure and the convex structure can be combined on the separator of the present invention to improve rate of injecting the solution. In the combined structure (combination type), the concave structures and the convex structures are preferably formed alternately. The pattern of the combined structure (combination type) in which straight lines are formed alternately is illustrated in FIG. 7 as a schematic plane view. In FIG. 7, the solid line represents the concave region, and the dotted line represents the convex region.

The above-mentioned concave or convex region guides the flow of the non-aqueous electrolytic solution in the direction essentially perpendicular to the length direction of the battery separator. In addition to the above-mentioned concave or convex regions, other concave or convex regions in the form of a line, a circle or a polygon can be formed to promote permeation of the guided non-aqueous electrolytic solution into the separator in the length direction of the battery separator. In the case that a convex structure is formed as the additional structure, the structures should be arranged uniformly in the direction essentially perpendicular to the length direction of the battery separator. For the above arrangement, the battery element can be wound up uniformly. The schematic plane views of the patterns of the combination of the concave regions with the additional convex regions are shown in FIGS. 8 to 10. FIGS. 8 to 10 illustrate a combination of straight lines with additional line segments, a combination of straight lines with additional slant line segments, and a combination of V-shapes with additional circles. In the figures, the solid line represents the concave region, and the dotted line represents the convex region.

The above-prepared separator for the battery has a gas permeability preferably of 30 seconds per 100 cc or more, more preferably of 50 seconds per 100 cc or more, and most preferably of 100 seconds per 100 cc or more. The separator for the battery has a gas permeability preferably of 1,000 seconds per 100 cc or less, more preferably of 900 seconds per 100 cc or less, and most preferably of 800 seconds per 100 cc or less.

The pores preferably have the maximum pore diameter mode in the range of 0.02 to 3 μm. The porosity preferably is in the range of 30% to 85%. The porosity is so adjusted to improve the battery capacity. The thickness of the battery separator is preferably 5 μm or more, more preferably 8 μm or more, and most preferably 10 μm or more. The thickness is preferably 100 μm or less, more preferably 40 μm or less, and most preferably 30 μm or less.

There is no specific limitation with respect to materials of the lithium secondary battery other than the separator according to the present invention. The materials of the conventional lithium secondary battery can be used in the present invention.

A non-aqueous solvent is used in the lithium secondary battery in addition to the battery separator according to the present invention. Examples of the non-aqueous solvent include: cyclic carbonates such as ethylene carbonate (EC), propylene carbonate (PC), and butylene carbonate (BC); lactones such as γ-butyrolactone (GBL) and γ-valerolactone (GVL); linear carbonates such as dimethyl carbonate (DMC), methyl ethyl carbonate (MEC), diethyl carbonate (DEC), methyl propyl carbonate (MPC), dipropyl carbonate (DPC), methyl butyl carbonate (MBC), and dibutyl carbonate (DBC); ethers such as tetrahydrofuran, 2-methyltetrahydrofuran, 1,4-dioxane, 1,2-dimethoxyethane, 1,2-diethoxyethane, and 1,2-dibutoxyethane; nitriles such as acetonitrile and adiponitrile; phosphoric esters such as trimethyl phosphate and trioctyl phosphate; linear esters such as butyl formate, methyl propionate, methyl pivalate, butyl pivalate, and octyl pivalate; and amides such as dimethylformamide. The non-aqueous solvent preferably contains at least one solvent selected from the group consisting of the cyclic carbonates, lactones, linear carbonates and linear esters are generally mixed to obtain appropriate properties. Examples of combinations of the non-aqueous solvents include a combination of a cyclic carbonate and a linear carbonate, a combination of a cyclic carbonate and a lactone, a combination of a lactone and a linear ester, a combination of a cyclic carbonate, a lactone and a linear ester, a combination of a cyclic carbonate, a linear carbonate and a lactone, a combination of a cyclic carbonate and an ether, a combination of a cyclic carbonate, a linear carbonate and an ether, and a combination of a cyclic carbonate, a linear carbonate and a linear ester. There is no specific limitation with respect to the mixing ratio of the non-aqueous solvents. The non-aqueous solvent preferably contains at least one of the cyclic carbonate and the linear carbonate. The combination of the cyclic carbonate and the linear carbonate is preferred to prepare a battery having improved cyclic characteristics and high capacity.

In the non-aqueous solvent, the volume ratio of the cyclic carbonate and the linear carbonate is preferably in the range of 20:80 to 40:60, and more preferably in the range of 25:75 to 35:65. The linear carbonate preferably is a linear asymmetric carbonate. Examples of the linear asymmetric carbonate include methyl ethyl carbonate, methyl propyl carbonate and methyl butyl carbonate. The linear asymmetric carbonate most preferably is methyl ethyl carbonate, which is fluid in low temperature and scarcely evaporates because it has a relatively high boiling point. The methyl ethyl carbonate (linear asymmetric carbonate) can be used in combination with a linear symmetric carbonate such as dimethyl carbonate or diethyl carbonate. The volume ratio of methyl ethyl carbonate to dimethyl carbonate and/or diethyl carbonate is preferably in the range of 100/0 to 51/49, and more preferably in the range of 100/0 to 70/30.

In the combinations of the non-aqueous solvents including the lactone, the volume ratio of the lactone is preferably larger than other solvent.

The non-aqueous solvent preferably contains at least one compound having a double bond such as vinylene carbonate (VC), dimethylvinylene carbonate, vinylethylene carbonate, α-angelica lactone or divinyl sulfone.

The solvent also preferably contains at least one compound having the S=O bonding such as 1,3-propanesultone (PS), 1,4-butanesultone, pentafluorophenyl methanesulfonate (MSPFB), glycol sulfite, propylene sulfite, glycol sulfate, propylene sulfate, 1,4-butanediol dimethanesulfonate, or ethylene glycol dimethanesulfonate.

The battery of high capacity necessarily has an electrode composite with a high density. Accordingly, it is difficult to smoothly inject a solution into the conventional battery of high capacity. Therefore, the conventional battery has rather poor cyclic characteristics. The cyclic characteristics can be improved using a compound having a double bond and/or a compound having the S=O bonding in addition to the separator according to the present invention.

In the case that the amount of the compound having a double bond is extremely large, the battery performance might be degraded. In the case that the amount of the compound is extremely small, the battery performance could not be obtained to the degree as expected. The amount of the compound having the double bond is preferably 0.01 wt. % or more, more preferably 0.1 wt. % or more, and most preferably 0.5 wt. % or more, based on the total amount of the non-aqueous electrolytic solution. The amount is preferably 10 wt. % or less, more preferably 7 wt. % or less, and most preferably 5 wt. % or less.

In the case that the amount of the compound having the S=O bonding is extremely large, the battery performance might be degraded. In the case that the amount of the compound is extremely small, the battery performance could not be obtained to the degree as expected. The amount of the compound having the S=O bonding is preferably 0.01 wt. % or more, more preferably 0.1 wt. % or more, and most preferably 0.5 wt. % or more, based on the total amount of the non-aqueous electrolytic solution. The amount is preferably 10 wt. % or less, more preferably 7 wt. % or less, and most preferably 5 wt. % or less.

An aromatic compound can be used in combination with the separator according to the present invention to secure safety of the battery from excessive charge. Examples of the aromatic compounds include cyclohexylbenzene, a fluorocyclohexylbenzene compound (e.g., 1-fluoro-2-cyclohexylbenzene, 1-fluoro-3-cyclohexylbenzene, or 1-fluoro-4-cyclohexylbenzene), biphenyl, terphenyl (o-, m-, p-), diphenyl ether, 2-fluorophenyl phenyl ether, 4-fluorophenyl phenyl ether, fluorobenzene, difluorobenzene (o-, m-, p-), 2-fluorobiphenyl, 4-fluorobiphenyl, 2,4-difluoroanisole, 2,5-difluoroanisole, 2,6-difluoroanisole, tert-butylbenzene, 1,3-di-tert-butylbenzene, 1-fluoro-4-tert-butylbenzene, tert-pentylbenzene, 4-tert-butylbiphenyl, tert-pentylbiphenyl, a partially hydrogenated o-terphenyl (such as 1,2-dicyclohexylbenzene, 2-phenylbicyclohexyl, 1,2-diphenylcyclohexane, or o-cyclohexylbiphenyl), a partially hydrogenated m-terphenyl (examples analogous to the examples of the partially hydrogenated o-terphenyl), and a partially hydrogenated p-terphenyl (examples analogous to the examples of the partially hydrogenated o-terphenyl). In the battery having the separator according to the present invention, the aromatic compound preferably has a cyclohexylbenzene or diphenyl structure. An aromatic compound substituted with a fluorine atom is also preferred.

In the case that the amount of the aromatic compound is extremely large, the battery performance might be degraded. In the case that the amount of the compound is extremely small, the safety of the battery could not be improved to the grade as expected. The amount of the aromatic compound is preferably 0.1 wt. % or more, more preferably 0.5 wt. % or more, and most preferably 1 wt. % or more, based on the total amount of the non-aqueous electrolytic solution. On the other hand, the amount is preferably 10 wt. % or less, more preferably 7 wt. % or less, and most preferably 5 wt. % or less.

In the battery having the separator according to the present invention, the aromatic compound is preferably used in combination with the compound having a double bond and/or the compound having the S=O bonding to give a lithium secondary battery further improved in cyclic characteristics and safety.

Examples of the electrolyte salt used in the present invention include $LiPF_6$, $LiBF_4$, $LiClO_4$ and $CF_3SO_3Li$. Examples further include lithium salts comprising a chain alkyl group such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, and lithium salts comprising a cyclic alkylene group such as $(CF_2)_2(SO_2)_2NLi$, $(CF_2)_3(SO_2)_2NLi$. One electrolyte salt can be used in the solution. However, two or more electrolyte salts can be used in combination. The concentration of the electrolyte salts dissolved in the non-aqueous medium is preferably 0.1 M or more, more preferably 0.5 M or more, and most preferably 0.7 M or more. The concentration is preferably 3 M or less, more preferably 2 M or less, and most preferably 1.5 M or less.

The non-aqueous electrolytic solution can be obtained by mixing the non-aqueous solvents, and dissolving the electrolyte salt in the mixture.

The battery according to the invention can contain air or carbon dioxide to inhibit generation of a gas caused by decomposition of the electrolytic solution and to improve battery performance such as cycle and storage characteristics.

Carbon dioxide or air can be incorporated (dissolved) in the non-aqueous electrolytic solution in the present invention according to a method (1) of contacting the non-aqueous electrolytic solution to air or a carbon dioxide-containing gas to introduce the air or the gas into the solution, and then injecting the solution into the battery, or a method of (2) injecting the non-aqueous electrolytic solution into the battery, and then introducing air or a carbon dioxide-containing gas into the battery before or after sealing the battery. The two methods can be used in combination. The amount of the moisture contained in the air or carbon dioxide-containing gas is preferably small as possible. The amount of the moisture is so reduced that the due point of the air or gas is lower than −40° C., and more preferably lower than −50° C.

The whole volume of the non-aqueous electrolytic solution can be injected into the battery according to the present invention at once. However, the solution is preferably portionwise injected into the battery. The battery can is preferably placed under reduced pressure (preferably 500 to 1 Torr, and more preferably 400 to 40 Torr) or increased pressure to shorten the time required for injecting the electrolytic solution. Further, centrifugal force or ultrasonic wave can be applied to the battery can to shorten the injection time.

An active positive electrode material preferably is an oxide such as $MnO_2$, $V_2O_5$ or a complex oxide of lithium with cobalt, manganese or nickel. Only one material can be selected and used as the active positive electrode material. Further, two or more active positive electrode materials can be used in combination. Examples of the complex lithium oxide include $LiCoO_2$, $LiMn_2O_4$, $LiNiO_2$, $LiCo_{1-x}Ni_xO_2$ (0.01<x<1) and $LiMn_yNi_zCo_{1-y-z}O_2$. The two or more active positive electrode materials can be mixed in an appropriate way. Examples of the mixtures include a mixture of $LiCoO_2$ with $LiMn_2O_4$, a mixture of $LiCoO_2$ with $LiNiO_2$, and a mixture of $LiMn_2O_4$ with $LiNiO_2$. The active positive electrode material preferably is a complex metal oxide of lithium, such as $LiCoO_2$, $LiMn_2O_4$ or $LiNiO_2$. The material more preferably shows a voltage of 4.3 V or more when the voltage of an open-circuit is measured using lithium as standard after complete the electric charge. The positive electrode material most preferably is a complex metal oxide of lithium containing Co or Ni. A portion of a complex metal oxide of lithium can be replaced with another metal. For example, a portion of Co contained in $LiCoO_2$ can be replaced with Sn, Mg, Fe, Ti, Al, Zr, Cr, V, Ga, Zn or Cu. The battery separator according to the present invention is favorably employed in a lithium battery using an active positive electrode material suitable for a high voltage and a high energy density.

An electroconductive material that does not cause a chemical degradation can be used as the conductive material for the positive electrode. Examples of the conductive material include graphites such as natural graphite (e.g., scaly graphite), artificial graphite, and carbon blacks such as acetylene black, ketjenblack, channel black, furnace black, lamp black, and thermal black. Graphite and carbon black can be used in combination at a certain mixing ratio. The positive electrode composite contains the conductive material preferably in an amount of 1 to 10 wt. %, and more preferably in an amount of 2 to 5 wt. %.

The positive electrode can be formed by mixing the active positive electrode material with such a conductive material as acetylene black, carbon black, or a binder to prepare a positive electrode composite material, coating a collecting material with the positive electrode material, drying the electrode material, pressing and molding them, and heating them at a temperature of 50 to 250° C. for about 2 hours under reduced pressure. Examples of the binder include polytetrafluoroethylene (PTFE), polyvinylidene fluoride (PVDF), styrene/butadiene copolymer (SBR), acrylonitrile/butadiene copolymer (NBR), and carboxymethylcellulose (CMC). Examples of the collecting material include aluminum-foil and a stainless lath board.

A material capable of absorbing and releasing lithium can be used as the negative electrode. Examples of the material include metallic lithium, lithium alloy (such as an alloy of lithium with Al, Sn, Zn or Si), tin or a tin compound, silicon or a silicon compound, and a carbonaceous material such as thermally decomposed carbon, coke, graphite (e.g., artificial graphite, natural graphite), a combustion product of an organic polymeric compound, or carbon fiber.

The negative electrode (active anode material) preferably comprises a carbonaceous material having a distance ($d_{002}$) between lattice faces (002) of 0.340 nm or less. The carbonaceous material more preferably is graphite having a graphitic crystal structure with the distance ($d_{002}$) in the range of 0.335 to 0.337 nm. One material can be selected and used as the active anode material. However, two or more active anode materials can be used in combination. A powdery material such as that of carbonaceous material can be used as a negative electrode composite material by mixing the material with a binder. Examples of the binder include ethylene/propylene diene interpolymer (EPDM), polytetrafluoroethylene (PTFE), polyvinylidene fluoride (PVDF), styrene/butadiene copolymer (SBR), acrylonitrile/butadiene copolymer (NBR), and carboxymethyl-cellulose (CMC). There is no specific limitation with respect to the method for forming the negative electrode. The negative electrode can be prepared in the same manner as in the above-mentioned method for forming the positive electrode.

The present invention is advantageously used in a lithium secondary battery containing an electrode composite of high density. The positive electrode composite layer formed on aluminum foil has a density preferably in the range of 3.2 to 4.0 g/cm³, more preferably in the range of 3.3 to 3.9 g/cm³, and most preferably in the range of 3.4 to 3.8 g/cm³. If the density of the positive electrode is more than 4.0 g/cm³, it is difficult to prepare the battery. The negative electrode composite layer formed on copper foil has a density preferably in the range of 1.3 to 2.0 g/cm³, more preferably in the range of 1.4 to 1.9 g/cm³, and most preferably in the range of 1.5 to 1.8 g/cm³.

The positive electrode layer has a thickness (per one side of the collector) preferably in the range of 30 to 120 μm, and more preferably in the range of 50 to 100 μm. The negative electrode layer has a thickness (per one side of the collector) preferably in the range of 1 to 100 μm, and more preferably in the range of 3 to 70 μm.

The lithium secondary battery according to the present invention shows excellent cycle characteristics for a long term even if the charging termination voltage is higher than 4.2 V. The battery further shows excellent cycle characteristics even if the charging termination voltage is higher than 4.3 V. The discharging termination voltage can be 2.5 V or more, and further can be 2.8 V or more. There is no specific limitation with respect to the current level. The battery is generally discharged at a constant current of 0.1 to 3 C. The lithium secondary battery according to the present invention can be charged and discharged at a temperature in a wide range of −40° C. to 100° C. The battery is preferably charged and discharged at a temperature of 0° C. to 80° C.

A safety valve can be attached to a sealing plate to prevent the inner pressure from increasing in the lithium secondary battery. A part of the battery such as a battery cell (can) or a gasket can be cut to prevent pressure increase. At least one of various conventional safety attachments (for example overcurrent-preventing devices such as a fuse, a bimetal and a PTC device) is preferably attached to the battery. The overcurrent-preventing device is preferably provided in addition to the above-mentioned shutdown function of the battery separator to further improve the safety of the battery.

Two or more lithium secondary batteries according to the present invention can be placed in a battery package while arranging the batteries in series or parallel. A safety circuit (which has functions of monitoring conditions such as voltage, temperature and current in each of the battery or in the combined batteries, and breaking the current) can be attached to the battery package in addition to a safety attachment such as a PTC element, a thermal fuse, a fuse, and a current breaker.

The battery of the present invention can be used in various devices such as a mobile phone, a notebook computer, PDA, a camcorder, a compact camera, a shaver, an electric tool, and an automobile. The lithium secondary battery according to the present invention is highly reliable and advantageously used in devices requiring the charging current of 0.5 A or more.

EXAMPLES

The present invention is described by referring to the following examples.

Example 1

(1) Preparation of Separator

A long porous laminate film comprising three layers of polypropylene (PP) layer/polyethylene (PE) layer/polypropylene (PP) layer was pressed under heating between embossed rollers heated at 130° C. to form a linear concave surface having a non-porous bottom (illustrated in FIG. 1), which extends in a direction forming an angle of 90° with the length direction of the laminate film, as is shown in FIG. 3. The concave regions were formed at a rate of 0.2 region per 1 centimeter in the length direction of the laminate film. The average depth of the concave regions was 8 μm, the average width was 200 μm, the thickness was 25.7 μm, the gas permeability was 530 seconds per 100 cc, the maximum pore diameter was 0.12 μm, and the porosity was 41%.

(2) Evaluation of Electrolytic Solution Injecting Rate

A lithium secondary battery using the above-prepared separator according the present invention was evaluated in connection with an improvement on the rate of injecting an electrolytic solution, as is described below.

The separator was placed on an aluminum foil whose thickness was 22 μm, and they were wound up cylindrically to form a dummy battery. The dummy battery is in the form of a cylindrical shape having the size of 9.5 mmϕ (outer diameter)×60 mm (height).

$LiPF_6$ was dissolved in a mixture of diethyl carbonate and propylene carbonate at a mixing ratio of 1:1 (volume to volume) to prepare a 1 M/L non-aqueous electrolytic solution. The dummy battery was immersed in the non-aqueous electrolytic solution for a certain time. The weight of the battery was measured before and after the immersing process. The rate of absorbing the non-aqueous electrolytic solution (in term of increase of the weight) is shown in FIG. 12.

(3) Evaluation of Lithium Secondary Battery

A cylindrical battery was prepared in the manner as described below to evaluate the lithium secondary battery according to the present invention in connection with cyclic characteristics and effects of securing the battery from excessive charge.

(Preparation of Non-Aqueous Electrolytic Solution)

A non-aqueous solvent of EC:MEC having a volume ratio of 3:7 was prepared. $LiPF_6$ was dissolved in the solvent to prepare a 1M non aqueous electrolytic solution. To the non-aqueous electrolytic solution, 2 wt. % of vinylene carbonate (VC), 1 wt. % of 1,3-propanesultone (PS), and 2 wt. % of cyclohexylbenzene (CHB) were added. The percentage was expressed based on the non-aqueous electrolytic solution.

(Preparation of Lithium Secondary Battery)

90 wt. % of $LiCoO_2$ (active positive electrode material), 5 wt. % of acetylene black (conductive material), and 5 wt. % of polyvinylidene fluoride (binder) were mixed. To the mixture, 1-methyl-2-pyrrolidone (solvent) was added. A surface of aluminum foil was coated with the resulting solution. The mixture was dried, molded under pressure, and heated to form a positive electrode.

95 wt. % of artificial graphite (active negative electrode material) having a graphitic crystalline structure with a distance ($d_{002}$) of 0.335 nm between lattice faces (002), and 5 wt. % of polyvinylidene-fluoride (binder) were mixed. To the mixture, 1-methyl-2-pyrrolidone (solvent) was added. A surface of copper foil was coated with the resulting solution. The mixture was dried, molded under pressure and heated to form a negative electrode.

The positive electrode, the negative electrode and the separator were wound up cylindrically, and placed in a battery vessel. The non-aqueous electrolytic solution was poured into the battery. The air having the dew point of −60° C. was introduced into the battery, and the battery was sealed to prepare a cylindrical battery having the 18650 size (diameter: 18 mm, height: 65 mm). A pressure-dischargeable opening and an inner current breaker (PTC element) were attached to the battery. The positive electrode composition layer has a density of 3.5 g/cm$^3$, and the negative electrode composition layer has a density of 1.6 g/cm$^3$. The positive electrode layer has a thickness of 70 μm (per one side of the collector), and the negative electrode layer has a thickness of 60 μm (per one side of the collector).

(Measurement of Battery Performance)

The 18650 battery was charged with the constant current of 2.2 A (1 C) at a high temperature (45° C.) to reach 4.2 V. The battery was further charged under the constant voltage for 3 hours in total to reach the terminal voltage of 4.2 V. The battery was discharged under the constant current of 2.2 A (1 C) to reach the terminal voltage of 2.8 V. The cycle of charge and discharge was repeated. The initial discharging capacity was the essentially same as that of Comparison Example 1 described below. The battery performance was measured after 200 cycles. The retention of the discharging capacity relative to the initial discharging capacity (100%) was 83.1%.

After the cycle of charge and discharge was repeated five times, the 18650 battery was fully charged to reach 4.2V at the ordinary temperature (20° C.), and further charged with the constant current of 2.2 A (1 C) to conduct an excessive charge test. The temperature on the surface of the battery was lower than 120° C., which is the standard highest temperature for safety.

Comparison Example 1

(1) The long porous laminate film comprising three layers of polypropylene (PP) layer/polyethylene (PE) layer/polypropylene (PP) layer (the same as that used in Example 1) was used as the separator. The rate of absorbing the non-electrolytic solution (change of the weight) was measured in the same manner as in Example 1. The result is shown in FIG. 12.

(2) A lithium secondary battery was prepared in the same manner as in Example 1, except that the above-mentioned separator was used. The battery performance was measured after 200 cycles in the same manner as in Example 1. The retention of the discharging capacity relative to the initial discharging capacity (100%) was 75.7%. Further, the excessive charge test was conducted in the same manner as in Example 1. The temperature on the surface of the battery exceeded the temperature of 120° C.

Example 2

(1) Polyethylene filler was pressed under heating on a long porous laminate film comprising three layers of polypropylene (PP) layer/polyethylene (PE) layer/polypropylene (PP) layer to form a separator according to the present invention, which is the long porous laminate film having the sectional view shown in FIG. 2, and the non-porous convex regions shown in FIG. 3. The rate of the convex regions was 0.2 region per 1 centimeter in the length direction of the separator. The average height of the convex regions was 15 µm, and the average width was 25 µm.

(2) The rate of absorbing the non-electrolytic solution (change of the weight) was measured in the same manner as in Example 1. The result is shown in FIG. 13.

(3) A lithium secondary battery was prepared in the same manner as in Example 1, except that the above-prepared separator was used; The battery performance was measured after 200 cycles in the same manner as in Example 1. The retention of the discharging capacity relative to the initial discharging capacity (100%) was 82.6%. Further, the excessive charge test was conducted in the same manner as in Example 1. The temperature on the surface of the battery was lower than 120° C.

Example 3

(1) A long porous laminate film comprising three layers of polypropylene (PP) layer/polyethylene (PE) layer/polypropylene (PP) layer was pressed under heating in the same manner as in Example 1 to form a separator according to the present invention, which has the non-porous concave regions in the form of slant lattice shown FIG. 5 and the sectional view shown in FIG. 1.

(2) The rate of absorbing the non-electrolytic solution (change of the weight) was measured in the same manner as in Example 1. The result is shown in FIG. 14.

(3) A lithium secondary battery was prepared in the same manner as in Example 1, except that the above-prepared separator was used. The battery performance was measured after 200 cycles in the same manner as in Example 1. The retention of the discharging capacity relative to the initial discharging capacity (100%) was 81.9%. Further, the excessive charge test was conducted in the same manner as in Example 1. The temperature on the surface of the battery was at a temperature of lower than 120° C.

Comparison Example 2

(1) The long porous laminate film comprising three layers of polypropylene (PP) layer/polyethylene (PE) layer/polypropylene (PP) layer used (the same as in Example 3) was used as the separator. The rate of absorbing the non-electrolytic solution (change of the weight) was measured in the same manner as in Example 1. The result is shown in FIG. 14.

DESCRIPTION OF THE MARKS

Figure 1:
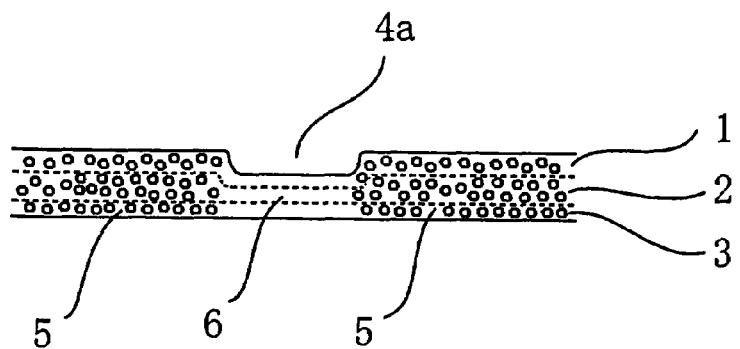
FIG. 1 is a sectional view partially showing an example of the battery separator according to the present invention.
Figure 2:
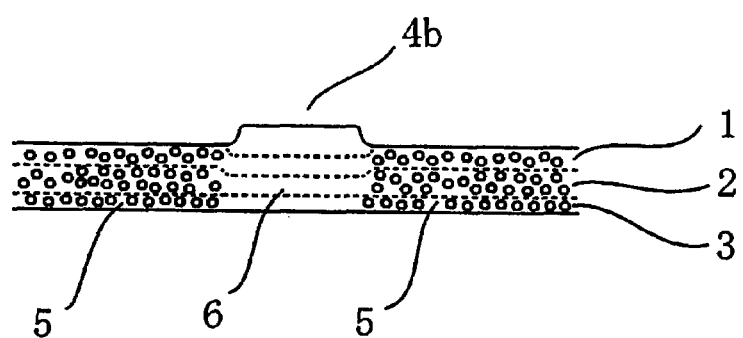
FIG. 2 is a sectional view partially showing another example of the battery separator according to the invention.
Figure 3:
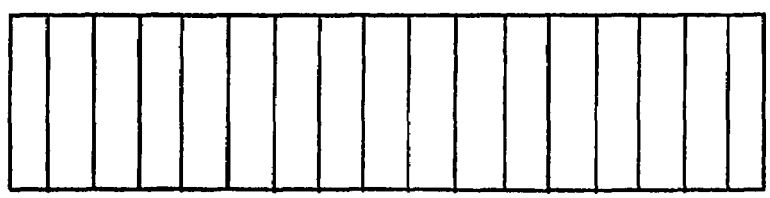
FIG. 3 is an example of a pattern for a concave or convex surface of the battery separator according to the invention.
Figure 4:
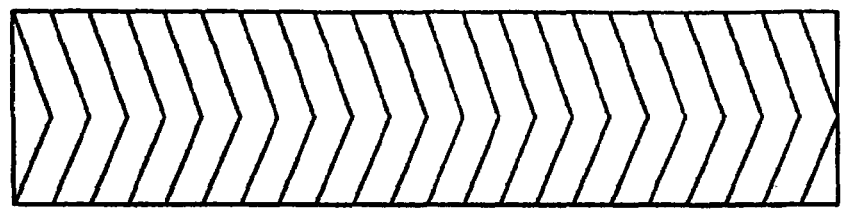
FIG. 4 is another example of a pattern for a concave or convex surface of the battery separator according to the invention.
Figure 5:
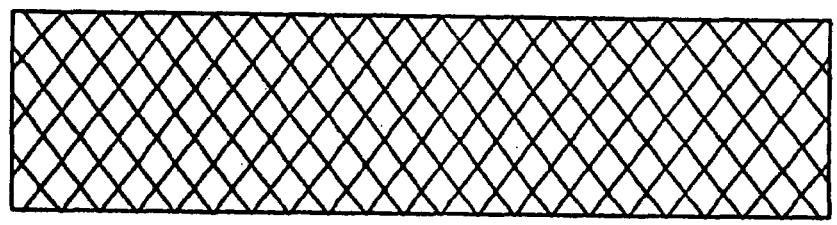
FIG. 5 is a further example of a pattern for a concave or convex surface of the battery separator according to the invention.
Figure 6:
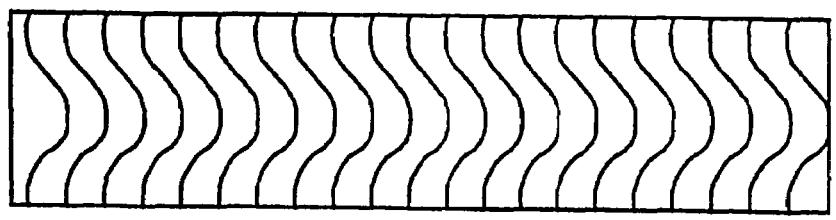
FIG. 6 is a still further example of a pattern for a concave or convex surface of the battery separator according to the invention.
Figure 7:
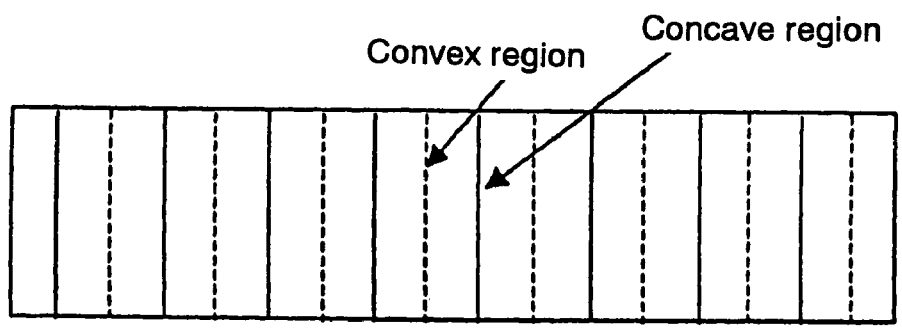
FIG. 7 is a still further example of a pattern for a concave or convex surface of the battery separator according to the invention.
Figure 8:
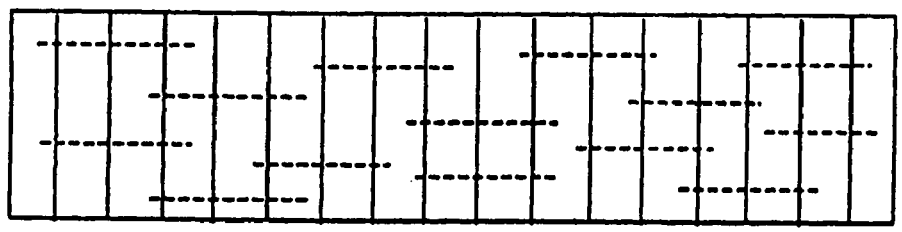
FIG. 8 is a still further example of a pattern for a concave or convex surface of the battery separator according to the invention.
Figure 9:
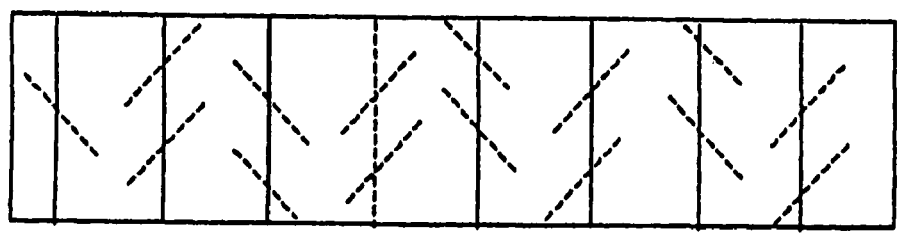
FIG. 9 is a still further example of a pattern for a concave or convex surface of the battery separator according to the invention.
Figure 10:
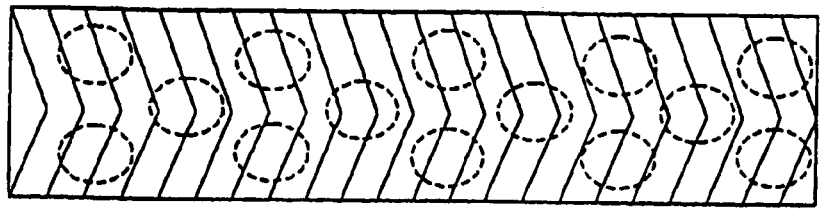
FIG. 10 is a still further example of a pattern for a concave or convex surface of the battery separator according to the invention.
Figure 11:
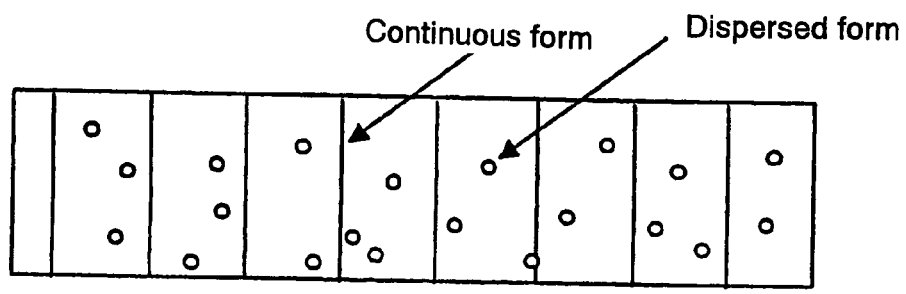
FIG. 11 is a still further example of a pattern for a concave or convex surface of the battery separator according to the invention.
Figure 12:
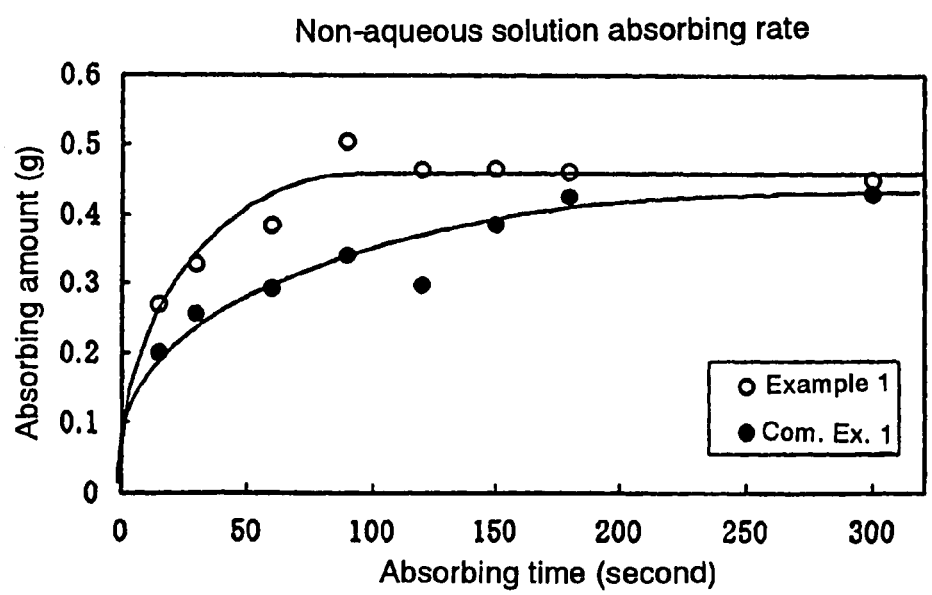
FIG. 12 is a graph showing changes in rate of absorbing the non-aqueous electrolytic solution in preparation of the lithium secondary battery using the battery separator of Example 1 according to the present invention and in preparation of the lithium secondary battery using the battery separator of Comparison Example 1 having neither concave nor convex surface.
Figure 13:
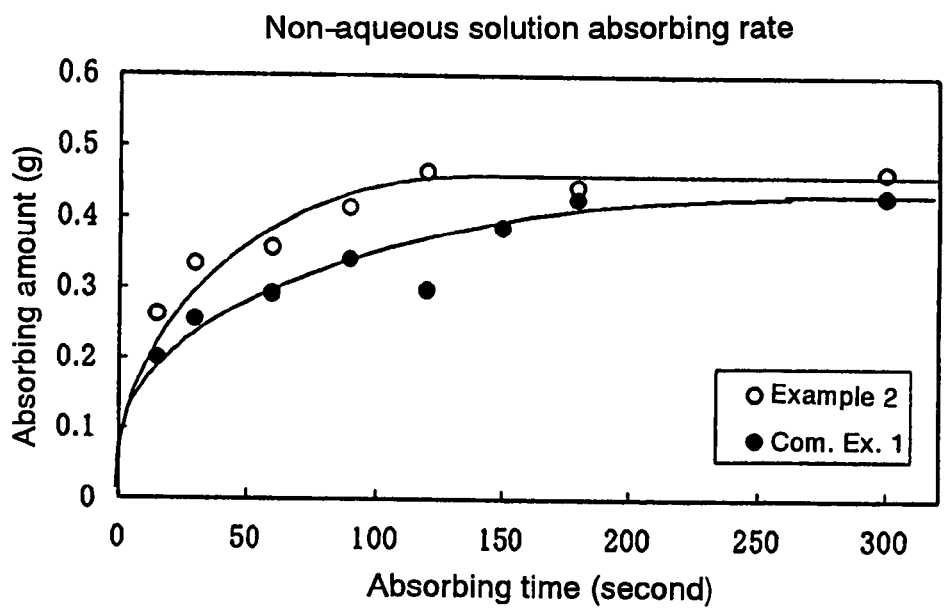
FIG. 13 is a graph showing changes in rate of absorbing the non-aqueous electrolytic solution in preparation of the lithium secondary battery using the battery separator of Example 2 according to the present invention and in preparation of the lithium secondary battery using the battery separator of Comparison Example 1 having neither concave nor convex surface.
Figure 14:
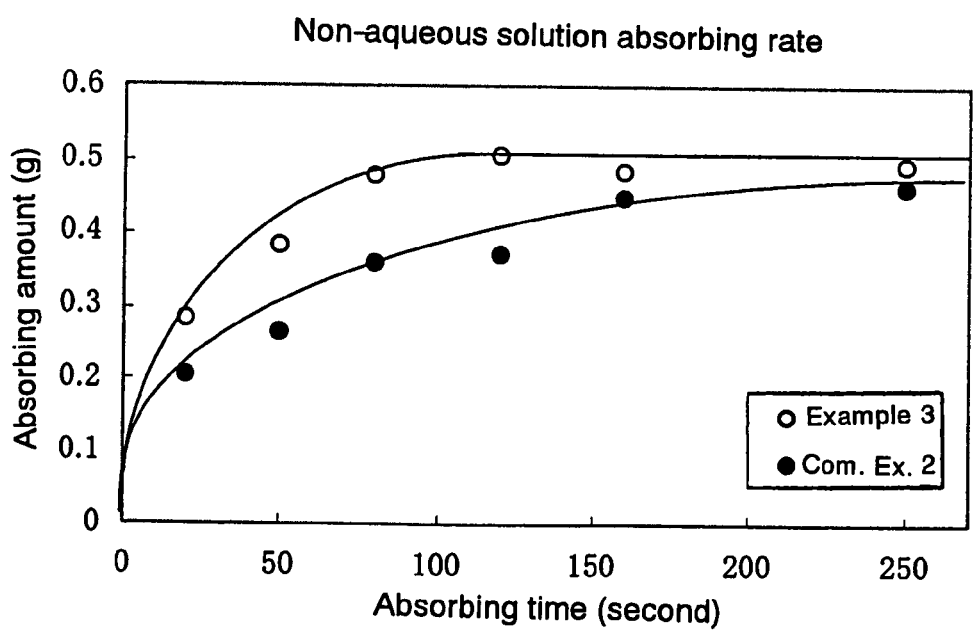
FIG. 14 is a graph showing changes in rate of absorbing the non-aqueous electrolytic solution in preparation of the lithium secondary battery using the battery separator of Example 3 according to the present invention and in preparation of the lithium secondary battery using the battery separator of Comparison Example 2 having neither concave nor convex surface.

1 Porous polypropylene layer
2 Porous polyethylene layer
3 Porous polypropylene layer
4a Concave surface
4b Convex surface
5 Porous region
6 Non-porous region

The invention claimed is:

1. A battery separator comprising a long porous film comprising one porous polyethylene film interposed between two porous polypropylene films in which plural non-porous linear regions are arranged in a width direction of the film, at least one surface of the linear regions being a concave or convex surface.

2. The battery separator of claim 1, wherein at least one end of the non-porous linear regions reaches a side face of the separator.

3. The battery separator of claim 1, wherein the non-porous linear regions are so arranged that a non-porous linear concave region and a non-porous linear convex region are arranged alternately with each other along a length direction of the separator.

4. The battery separator of claim 1, wherein the non-porous linear regions are arranged along a length direction of the separator to form 0.1 to 10 regions per centimeter.

5. A lithium secondary battery comprising a positive electrode, a negative electrode, a separator and a non-aqueous electrolytic solution, wherein the non-aqueous electrolytic solution contains at least one compound selected from the group consisting of vinylene carbonate, dimethylvinylene carbonate, vinylethylene carbonate, α-angelica lactone and divinylsulfone, and the separator comprises a long porous film in which plural non-porous linear regions are arranged in a width direction of the film, at least one surface of the linear regions being a concave or convex surface.

6. The lithium secondary battery of claim 5, wherein the non-aqueous electrolytic solution contains at least one compound selected from the group consisting of a cyclic carbonate, a linear carbonate, a linear ester, and a lactone.

* * * * *

UNITED STATES PATENT AND TRADEMARK OFFICE
CERTIFICATE OF CORRECTION

PATENT NO.       : 7,595,130 B2
APPLICATION NO. : 10/569971
DATED            : September 29, 2009
INVENTOR(S)      : Kawabata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 668 days.

Signed and Sealed this

Twenty-eighth Day of September, 2010

David J. Kappos
*Director of the United States Patent and Trademark Office*